United States Patent [19]
Acar

[11] 3,857,615
[45] Dec. 31, 1974

[54] PRESSURE REGULATING VALVE ASSEMBLY

[75] Inventor: Ali Acar, Los Angeles, Calif.

[73] Assignee: International Telephone and Telegraph Corporation, New York, N.Y.

[22] Filed: Nov. 12, 1973

[21] Appl. No.: 415,009

[52] U.S. Cl............ 303/21 F, 137/627.5, 303/54
[51] Int. Cl............................................ B60t 8/12
[58] Field of Search............. 188/181 A; 137/627.5; 303/13, 15, 21 F, 21 FS, 21 FP, 21 FRM, 21 CF, 21 CG, 40, 54

[56] References Cited
UNITED STATES PATENTS

| | | | |
|---|---|---|---|
| 2,919,162 | 12/1959 | Roberts | 303/21 F RM |
| 3,199,927 | 8/1965 | Bidlack et al. | 303/21 F RM |
| 3,525,555 | 8/1970 | Meyer et al. | 303/40 |
| 3,704,047 | 11/1972 | Yarber | 303/54 |
| 3,753,600 | 8/1973 | Gemmellard | 303/21 F RM |
| 3,758,167 | 9/1973 | Machek | 303/40 |

Primary Examiner—Duane A. Reger
Attorney, Agent, or Firm—Thomas L. Peterson

[57] ABSTRACT

A pressure regulating valve assembly for use in an anti-skid brake control system in which a flow restrictor is provided between the pilot valve and the diaphragm valve of the valve assembly which is operable in a low brake chamber pressure range to provide a gradual reapplication of brake pressure following the end of a skid.

26 Claims, 10 Drawing Figures

PRESSURE REGULATING VALVE ASSEMBLY

CROSS-REFERENCE TO RELATED APPLICATION

The present invention is a modification of and constitutes, in some respects, an improvement upon the three-way valve described and claimed in co-pending application of Roger Greenwood, Ser. No. 359,653, filed May 14, 1973, assigned to the assignee of the present application.

BACKGROUND OF THE INVENTION

This invention relates generally to a pressure regulating valve assembly and, more particularly, to such an assembly which is particularly suited for use in an anti-skid brake control system.

In general, an anti-skid brake control system functions to rapidly dump air from the brake chambers of a vehicle in response to an incipient skid condition of a braked wheel to prevent actual skidding of the wheel. More specifically, an electronic speed detection and controlling computer is utilized to detect an incipient skid condition, that is, when the wheel stops or almost stops rotating. The output of the computer is coupled to a solenoid operated pilot valve which controls a primary diaphragm three-way valve. Such a valve may be of the type disclosed in the aforementioned Greenwood application. Energizing the solenoid operated pilot valve causes air pressure to be dumped from the brake chambers through the diaphragm valve. When the brake chamber pressure reaches a predetermined low value, the wheels will commence rotating again. This rotation is sensed by the wheel speed sensing device which causes the solenoid operated pilot valve to be de-energized so that brake pressure is then re-applied through the diaphragm valve to the brake chambers.

It is the purpose of most valves used in anti-skid brake systems to regulate pressure between about 0 and 120 psi to the brake chambers and to be able to dump the air from the chambers in the shortest possible time. The systems vary from dumping all the air in the brake chambers or only a portion of this air depending on the signal received from the controlling computer. Generally, the rates of pressure rise and dump in the brake chambers are constant and equal, and related to the air flow restrictions into and out of the control valve and the flow and response characteristics of the valve. Under extremely slippery road conditions, when air pressure is released from the brake chambers to prevent a skid condition the brake chamber pressure may decrease down to about 30 psi before brake pressure is re-applied. At such low brake chamber pressures, it is desirable to re-apply the brake pressure at a slower rate than when operating at higher brake chamber pressures so that there is only a gradual re-application of brake pressure after a skid has ended. The purpose of the present invention is to provide a control valve which operates to restrict the rate at which brake pressure is re-applied at low brake chamber pressure chamber conditions. As a consequence, there is a greater time period before a skid will be encountered again, thus giving the electronics in the system and the inertia of all parts time to respond to a new skid condition thereby minimizing skiding under highly slippery road conditions.

SUMMARY OF THE INVENTION

According to the principal aspect of the present invention, there is provided a novel pressure regulating valve assembly for use in an anti-skid brake control system in which a flow restrictor is interposed between the pilot valve and diaphragm valve of the valve assembly utilized in the system. The flow restrictor is operable in a low brake pressure range, when a skid occurs on a slippery surface, to provide a gradual re-application of brake pressure following the dumping of air from the brake chambers. Accordingly, an anti-skid brake control system employing the pressure regulating valve of the present invention will perform more effectively to minimize or prevent skids when very slippery road conditions are encountered.

Other aspects and advantages of the present invention will become more apparent from the following detailed description taken in connection with the accompanying drawings.

DESCRIPTION OF THE PREFERRED EMBODIMENTS

Figure 1:
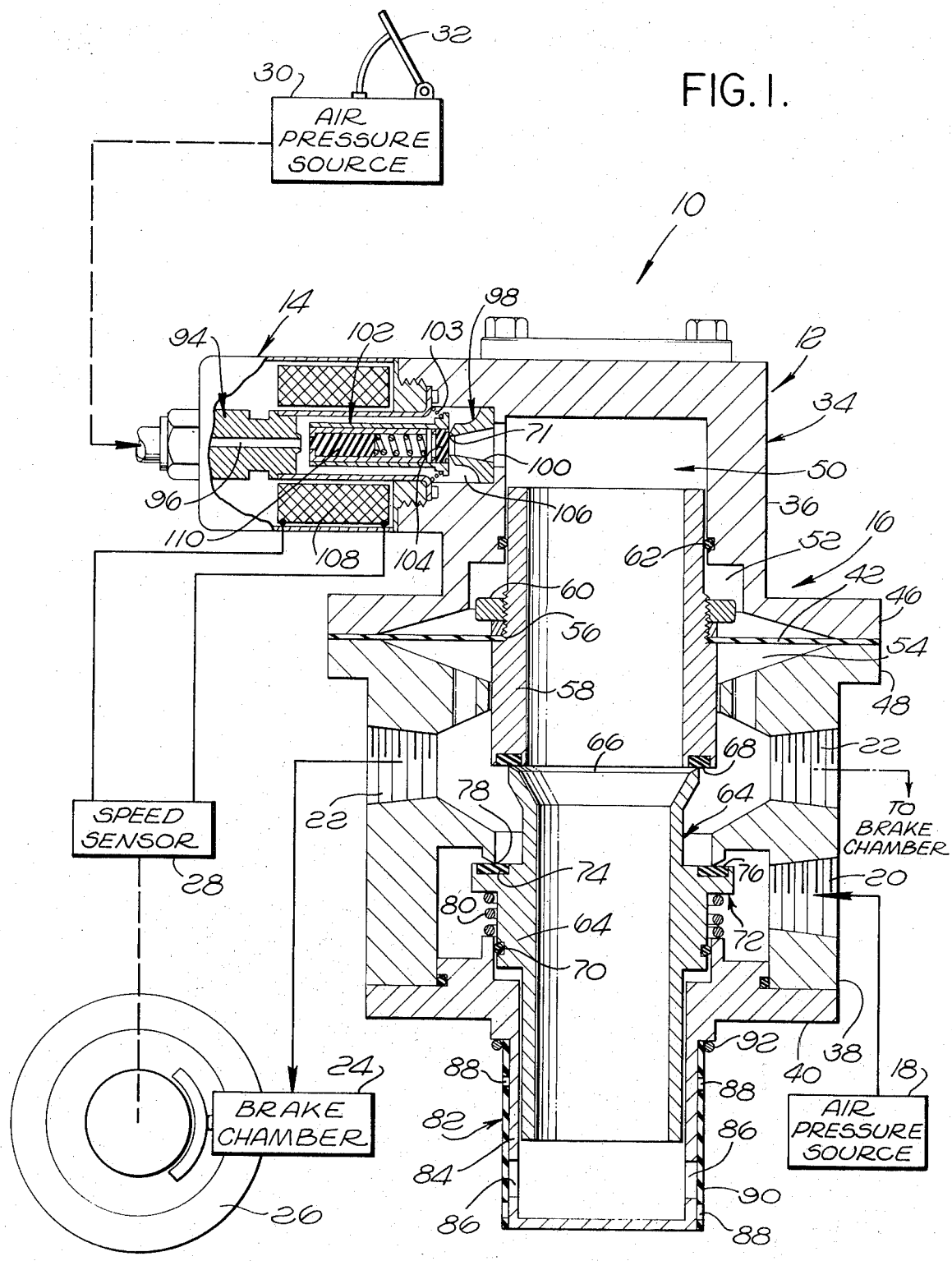
FIG. 1 is a schematic illustration of an anti-skid brake control system employing the pressure regulating valve assembly of the present invention, such valve assembly being shown in partial vertical section taken along lines 1—1 of FIG. 2.

Referring now to the drawings in detail, wherein like reference characters are utilized to designate like or corresponding parts through out the various views, there is schematically illustrated in FIG. 1 an anti-skid brake control system, generally designated 10, which employs the pressure regulating valve assembly of the invention, indicated by numeral 12. The valve assembly 12 includes a solenoid controlled pilot valve 14 and a primary diaphragm valve 16. An air pressure source 18 is coupled to an inlet port 20 in the diaphragm valve. Outlet ports 22 in the diaphragm valve are connected to brake chambers 24, only one being illustrated in FIG. 1. The brake chamber 24 is shown as being associated with a wheel 26 the speed of which is sensed by a speed sensing and controlling computer 28. The output of the computer is coupled to the solenoid operated pilot valve 14. Air pressure is conveyed to the pilot valve from a air pressure supply 30. Such pressure is controlled by a brake pedal 32. The air pressure supply 30 may be common with the air pressure source 18. Typically, the air pressure source utilized in the system is about 120 psi.

Referring now to the pressure regulating valve assembly 12 in greater detail, the assembly includes a valve body 34 comprising a bonnet 36, a base 38 and an end plate 40. A flexible diaphragm 42 has its outer edge fixed between circular flanges 46 and 48 of the bonnet 36 and base 38, respectively, by bolts (not shown). The end plate 40 may be secured to the bottom of the base 38 by any suitable means.

The valve body is formed with a chamber 50. This chamber is separated into upper and lower sections 52 and 54, respectively, by the diaphragm 42. The diaphragm has a circular hole 56 therethrough. A sleeve 58 is fixed through the hole to the diaphragm by a nut 60. An O-ring 62 provides an air tight seal between the outer surface of the sleeve 58 and the wall of the upper chamber section 52.

It is noted that the inlet port 20 and outlet ports 22 are provided in the base 38 of the valve assembly. A valve element or poppet 64 is provided for controlling the flow of fluid from the inlet port to the outlet port. This poppet has a hollow interior and is open at both ends. The poppet is also formed with an upper circular sharp edge 66 which engages a downwardly facing valve seat 68 provided on the bottom of the sleeve 58. The poppet 64 is sealed to the end plate 40 by an O-ring 70. The poppet has an outwardly projecting flange 72 with an annular groove 74 therein. The groove has a rubber sealing ring 76 fixed and sealed therein. The base 38 is formed with a downwardly extending sharp circular edge 78 defining a valve seat which is engaged by the rubber ring 76 on the poppet. The poppet is biased upwardly by a spring 80 to hold the ring 76 in sealing engagement with the seat 78.

A vent valve, generally designated 82, is provided on the lower portion of the valve assembly 12. The vent valve includes a hollow cylinder 84 which is integral with the end plate 40. The cylinder 84 has circular holes 86 therethrough which are out of alignment with holes 88 formed in a substantially cylindrical resilient rubber sleeve 90 placed over the exterior of the cylinder 84. A hose clamp 92 may be employed to hold the rubber sleeve 90 in a fixed position on the cylinder 84.

The pilot valve 14 includes a body 94 which is fixed relative to the bonnet 36 of the valve body. The body 94 is formed with an inlet passage 96 communicating with the air pressure supply 30. A fitting 98 provides an outlet passage 100 axially aligned with the inlet passage 96. A plunger 102 is movable between such inlet and outlet passages. The plunger is normally biased into the position illustrated in FIG. 1 by a spring 103. In this position, a sealing member 104 on the right end of the plunger closes the outlet passage 100 and the inlet passage 96 is open and in communication with a space 106 surrounding the plunger and the upper chamber section 52 above the diaphragm. A solenoid coil 108 surrounds the plunger 102 which is formed of a magnetic material. Energization of the coil 108 shifts the plunger 102 in the leftward direction so that a sealing member 110 in the plunger will close the inlet passage 96.

Figure 2:
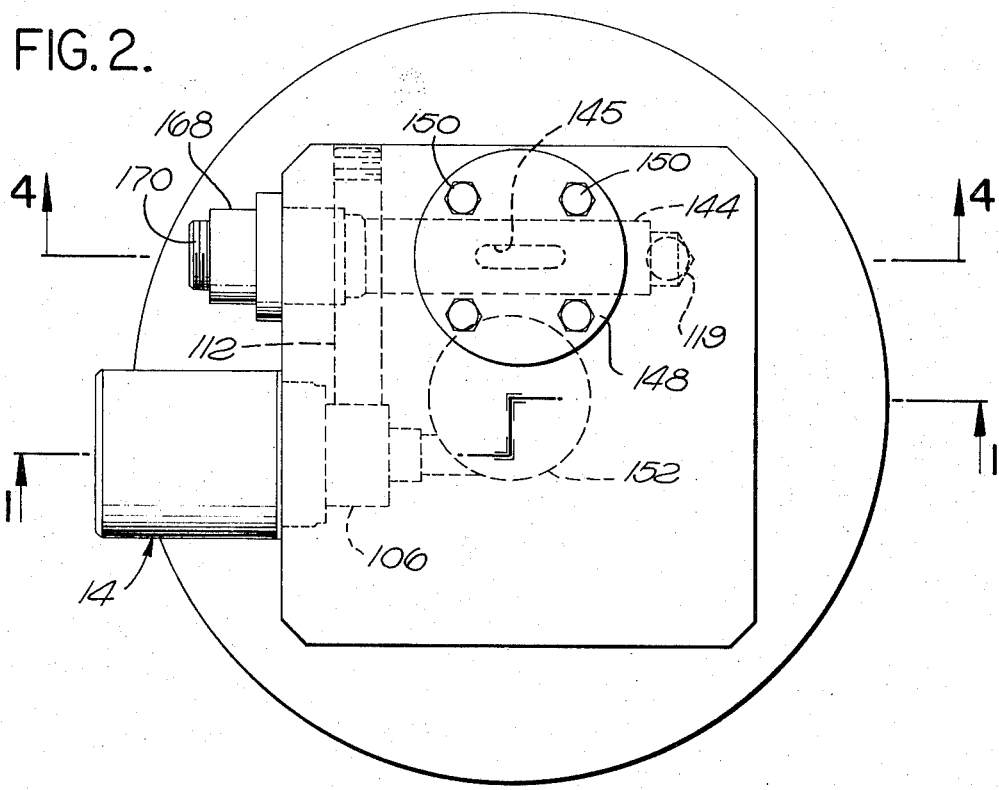
FIG. 2 is a top plan view of the valve assembly illustrated in FIG. 1.
Figure 3:
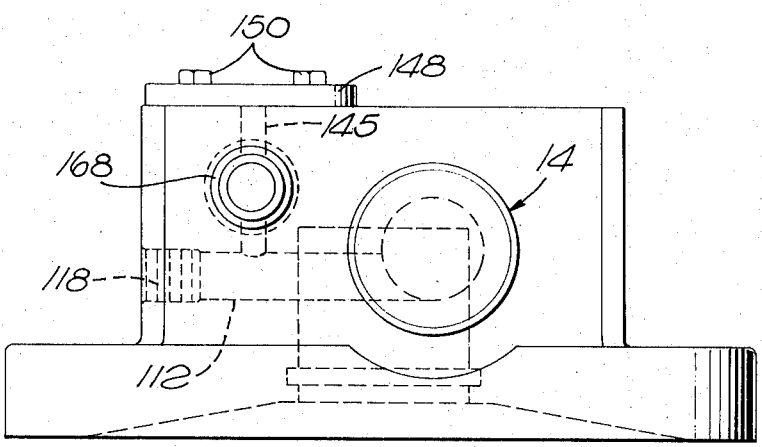
FIG. 3 is a side elevational view of the upper section of the valve assembly illustrated in FIGS. 1 and 2.
Figure 4:
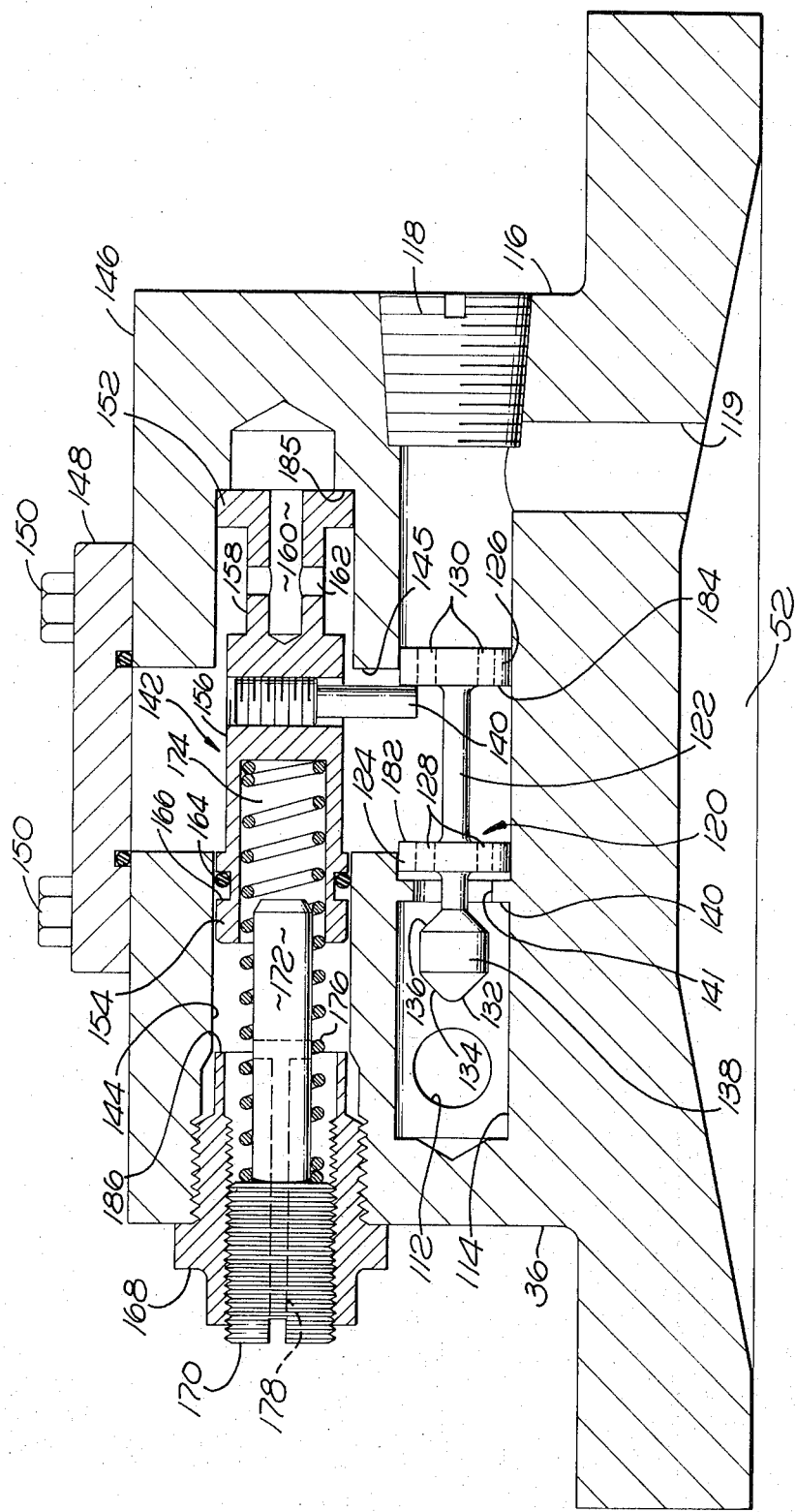
FIG. 4 is a partial vertical sectional view taken along line 4—4 of FIG. 2 illustrating the details of structure of the upper section of the valve assembly of the present invention, and particularly the flow restrictor and positioning device employed therein.

As seen in FIGS. 2 and 4, a horizontally extending passage 112 is formed in the bonnet 36. This passage opens into the space 106 which surrounds the plunger 102. The other end of the passage 112 opens at one end of a horizontally extending bore 114. The other end of the bore 114 opens at a wall 116. A plug 118 closes the other end of the bore. A vertical passage 119 extends from the bore 114 downwardly into the upper chamber section 52 above the diaphragm 42. Thus, the passage 112, bore 114 and passage 119 define an intermediate passageway between the pilot valve 14 and diaphragm valve 16.

When the plunger 102 of the pilot valve is positioned as shown in FIG. 1, air introduced into the pilot valve through the inlet passage 96 will pass through the space 106, passage 112, bore 114, and passage 119 to the upper chamber section 52 above the diaphragm 42 in the diaphragm valve urging the sleeve 58 and the poppet 64 downwardly. Downward movement of the poppet removes the sealing ring 76 from the valve seat 78 thereby providing flow communication between the inlet port 20 and the outlet ports 22. When the pressures on the opposite sides of the diaphragm 42 equalize, the spring 80 will return the poppet 64 to the position illustrated in FIG. 1 wherein the valve seat 78 is closed. It is noted that the outlet passage 100 of the pilot valve communicates with the upper region of the chamber 52 above the sleeve 58. Hence, the outlet passage 100 is in communication with the vent valve 82 through the hollow sleeve 58 and hollow poppet 64. When the solenoid 108 is energized to shift the plunger 102 in the leftward direction as viewed in FIG. 1, air pressure in the chamber 52 above the diaphragm 42 is vented to atmosphere through the vent valve 82 by escaping through the passage 119, bore 114, passage 112, space 106 and outlet passage 100. When pressure is thus reduced above the diaphragm 42, the sleeve 58 will rise whereby the sleeve will axially separate from the poppet thereby placing the outlet ports 22 in flow communication with the vent valve 82 to dump air from the brake chamber 24.

The valve assembly 12 disclosed so far, except for the specific structure of the intermediate passageway between the pilot valve and diaphragm valve, is described in greater detail in the aforementioned Greenwood application and constitutes no part of the present invention. In general, the anti-skid brake control system 10 functions as follows. Air is introduced into the pilot valve by operating the brake pedal 32. This causes downward movement of the diaphragm 42 and, hence, separation of the sealing ring 76 from the valve seat 78 thereby providing flow communication between the air pressure source 18 and the brake chamber 24. If the brake chamber pressure is sufficiently high to create a skidding condition, the locked skidding wheel condition is sensed by the wheel speed sensing control device 28. This device produces an output signal which energizes the solenoid 108 to close the inlet passage 96 and open the outlet passage 100 of the pilot valve, thus rapidly dumping the air pressure from the brake chamber 24 in the manner described before. When the brake chamber pressure reduces sufficiently that the wheel 26 commences rotating again, the wheel speed sensor 28 will produce a second signal which will de-energize the solenoid 108 thus allowing air to flow again from the supply 30 through the pilot valve to the diaphragm valve so that air pressure is re-applied to the brake chamber 24. As stated previously herein, generally the rates of pressure rise and dump in the brake chamber are essentially constant and equal.

Figure 6:
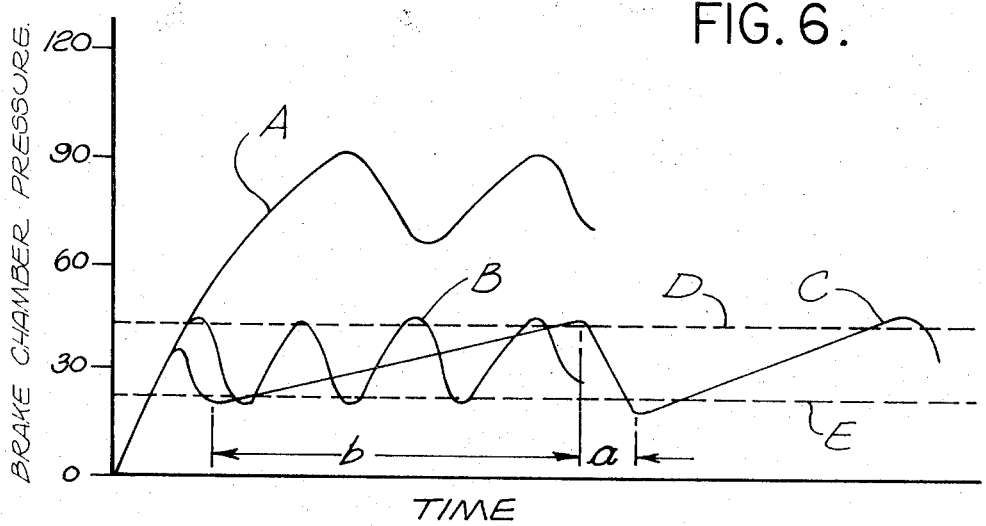
FIG. 6 is a graph illustrating brake chamber pressure characteristics of an anti-skid brake control system embodying a prior art pressure regulating valve assembly and of such a system embodying the valve assembly of the present invention.

Reference is now made to the graph appearing in FIG. 6 in which brake chamber pressure, in psi, is plotted against time. The curve A depicts the time to pressurize and dump a standard truck anti-skid brake system with the brake chamber pressure commencing at 0 and rising to a relatively high level of about 90 psi as would be the case when relatively dry road conditions are encountered. At this pressure level, a skid is sensed by the wheel speed sensing device 28 whereupon air from the brake chamber is dumped. The pressure will then drop to about 60 psi until the wheel commences rotating again whereupon brake pressure will be reapplied to increase the pressure in the brake chambers. Thus, as seen by the curve A in FIG. 6, the pressure rise and dump rates are essentially constant and equal. Curve B depicts the brake chamber pressure characteristics of a standard anti-skid brake system operating in a relatively low pressure range as would occur when highly slippery road conditions are encountered. The rates of pressure rise and dump into brake chamber are essentially constant and equal. Hence, substantial skidding may occur on highly slippery surfaces using the standard anti-skid braking system.

As explained previously herein, it is the object of the present invention to reduce the pressure rise rate when operating at low brake chamber pressures as occur when highly slippery road conditions are encountered. To achieve this end, in accordance with the present invention there is provided a flow restrictor, generally designated 120, which permits an increase in brake chamber pressure, when operating at a low brake chamber pressure range, at a rate less than when operating in the high pressure range so that there is a slower, or a softer, re-application of brake pressure after a skid has ended. The aforementioned low brake chamber pressure range is established by upper and lower set points designed into the valve, to be described later herein. The operating characteristic of the valve of the present invention is depicted by curve C in FIG. 6 in which the pressure rise time indicated at "b" is seen to greatly exceed the pressure dump time indicated at "a." Preferably the time b will exceed the time a seven to ten fold. By way of example only, time a may be 30 milliseconds and time b may be 240 milliseconds. The upper and lower set points are indicated by the broken horizontal lines D and E, respectively. It is noted from FIG. 6 that the restrictor 120 does not function to alter the brake chamber filling rate when operating in a relatively high brake chamber pressure, i.e., a pressure above the upper set point E.

Reference is now made to FIGS. 2 and 4 which most clearly show the structure of the flow restrictor 120 of the present invention. The flow restrictor is positioned in the bore 114 in the bonnet 36 of the valve body. The flow restrictor is a piston-like element comprising a stem 122 which has a pair of cylindrical spaced discs 124 and 126. A plurality of axially extending holes 128 and 130 are formed in the discs 124 and 126, respectively. Typically four holes may be provided in each of the discs. The stem 122 extends rearwardly from the disc 124 and terminates in a restrictor head 132. It is noted that the head 132 is on the end of the stem 122 closest to the pilot valve 14 so that air entering through the inlet passage of the pilot valve, passing through the passage 112 and entering the bore 114 will act initially upon the restrictor head end of the restrictor. The head 132 is formed with a conical rear surface 134 and a frusto-conical forwardly facing surface 136 which is joined to the rear surface by a cylindrical surface 138. A radially inwardly extending flange 140 is formed in the bore 114 providing a restriction. The diameter of the restriction opening 141 is slightly greater than the outer diameter of the cylindrical section 138 of the head 132 so that the head may slide freely through the restriction. The gap between the cylindrical section 138 and the restriction 140 determines the rate of filling of the brake chamber during the restriction mode. It is noted that the total area of the holes in each disc 124 and 126 is greater than the area of the restriction opening 141 so that the discs will not restrict the flow of air past the restrictor 120.

A piston 142 is provided for positioning the flow restrictor 120 so that the head 132 is located within the restriction 140 when the pressure above the diaphragm 42 is between the upper and lower set points. The piston 142 is slidable in a bore 144 which is parallel to and above the bore 114. A vertically extending slot 145 is formed in the bonnet 36 providing flow communication between the bores 114 and 144. The upper end of the slot opens at the upper surface 146 of the bonnet. A plate 148 closes the upper end of the slot 144. The plate is secured to the bonnet by a plurality of screws 150.

The piston 142 is formed with two end sections 152 and 154 which are in sliding engagement with the surface of the bore 144, and two intermediate reduced diameter sections 156 and 158. The section 158 is adjacent to the end section 152 and has a diameter less than that of the intermediate section 156. An axial bore 160 extends through the end section 152 and into the intermediate section 158. A radially extending bore 162 in the section 158 communicates with the bore 160 to provide flow communication between opposite sides of the end section 152. Thus, air pressure entering the bore 144 through the slot 145 from the bore 114 will act upon the piston 142 to shift it in the leftward direction as viewed in FIG. 4. An O-ring 164 is positioned in a groove 166 in the end section 154 of the piston to provide a seal between such end section and the wall of the bore 144.

A retainer 168 is threadly engaged in the left end of the bore 144. A set screw 170 is threaded into the retainer 168. A spring guide 172 is integrally formed on the set screw 170. This guide extends axially into a cylindrical recess 174 formed in the left end of the piston 142. The diameter of the guide 172 is somewhat less than the diameter of the recess 174 so that a coil spring 176 may be mounted in this recess surrounding the guide. The spring biases the piston 142 in the rightward direction as viewed in FIG. 4. A vent passage 178 is formed in the set screw 170 so that when the piston 142 is shifted in the leftward direction toward the retainer 168 air trapped in the bore 144 between these parts may escape to atmosphere through the passage 178. It will be appreciated that by altering the position of the set screw 170 in the retainer 168 pre-loading of the spring 176 may be adjusted. Also, the position of the retainer in the bonnet 36 may also be adjusted.

A radially extending extension pin 180 is threaded into the intermediate section 156 of the piston 142. The end of the pin extends downwardly in the space defined by the forwardly facing surface 182 provided by disc 124 and the rearwardly facing surface 184 provided by disc 126 on the flow restrictor 120. Thus, the extension pin 180 provides a lost motion connection between the positioning piston 142 and the flow restrictor 120.

An annular shoulder 185 is formed near the right end of bore 144. The inner end of the retainer 168 provides a second annular shoulder 186 which faces the piston 142. The shoulder 185 is located in the bore 144 so that when the piston 142 abuts the shoulder, the pin 180 will be adjacent to but will not engage the right side of slot 145. The retainer 168 is positioned so that when the piston abuts against the shoulder 186 thereon, the pin 180 will be adjacent to but will not contact the left side of the slot.

The restrictor 120 functions to restrict flow of gas to the brake chambers between the upper and lower set points mentioned previously. The set points are determined by design factors of the valve to suit predetermined slippery skid conditions, which are a function of vehicle weight and coefficient of friction of the road surface. The lower set point determines when the vehicle wheels commence rotating under slippery road conditions while the upper set point determines when the wheels lock and a skid occurs under such conditions. The lower set point is determined by the location of shoulder 185 and the pre-load of spring 176. The latter may be adjusted by set screw 170. The upper set point is determined by the spring rate of spring 176 and the position of shoulder 186, which may be altered by adjusting retainer 168.

Reference is now made to FIGS. 5a–5d which illustrate consecutive positions of the flow restrictor 120 and positioning piston 142 under various operating conditions. For purposes of clarity, the structures illustrated in FIGS. 5a–5d have been shown in a somewhat simplified form.

Figure 5A:
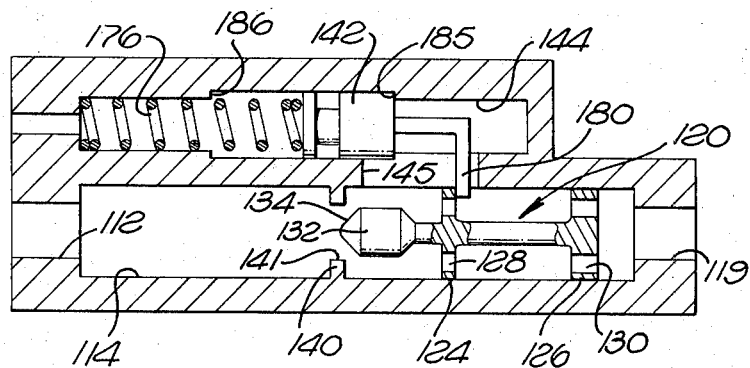
FIGS. 5a to 5d are somewhat schematic illustrations similar to FIG. 4 showing consecutive positions of the flow restrictor and positioning device during different operating conditions.

In FIG. 5a the flow restrictor 120 and the piston 142 are shown in the positions they would assume when the brake pedal is only slightly depressed so that the air pressure from the solenoid controlled pilot valve is between 0 and the lower set point, which may be about 20 psi. The spring 176 is pre-loaded to slightly higher than the lower set point, for example, about 25 psi. Hence, the spring will urge the piston 142 in the rightward direction against the shoulder 185. Air pressure introduced through the pilot valve 14 will enter the bore 114 through the passage 112 and will act upon the flow restrictor 120 to shift it to the right hand end of the bore. The disc 124 abuts the extension pin 180 and the head 132 is to the right of the restriction 140 in the bore. When the restrictor is so positioned, the projected area between the restriction 140 and the conical surface 134 on the restrictor head is equal to or greater than the area of the restriction opening so that the flow restrictor head causes no flow restriction through the bore. As previously mentioned, the discs 124 and 126 also do not restrict flow since the openings therein are larger than the restriction opening. Thus, air introduced into the bore 114 will flow relatively freely around the head 132, through the holes 128 and 130 in the discs, respectively, and will exit through the vertical passage 119 to the upper chamber section 52 above the diaphragm 42 in the diaphragm valve 16.

Figure 5B:
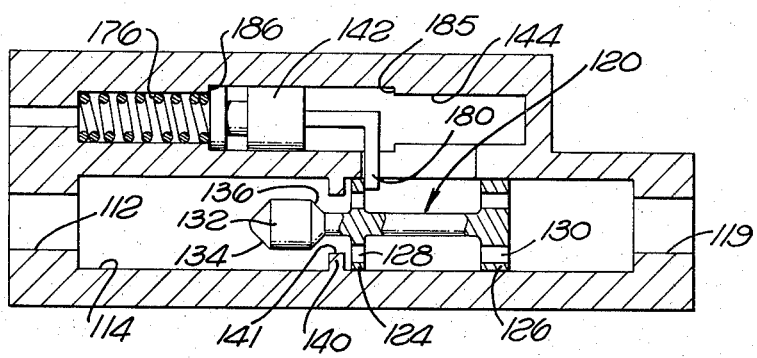
Figure 5C:
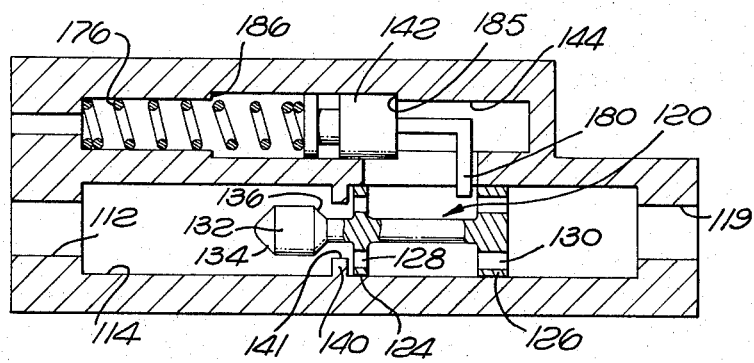
Figure 5D:
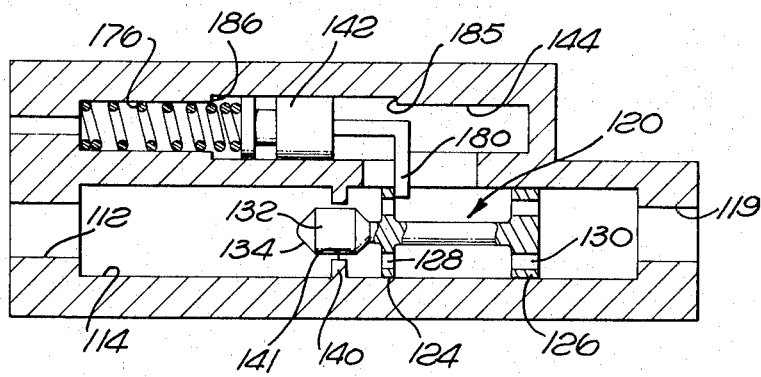

If the operator further slowly depresses the brake pedal 32 so that air pressure entering the bore 114 from the pilot valve exceeds the force of the spring 176, but is less than the upper set point which may be about 40 psi, air pressure in the bore 144 will overcome the force of the spring to shift the piston 142 in the leftward direction to the position seen in FIG. 5d. Under this condition the extension pin 180 will carry the flow restrictor 120 in the leftward direction so that the restrictor head 132 will be essentially centrally positioned in the restriction 140. With the flow restrictor so positioned, flow of air from the pilot valve through the bore 114 to the space above the diaphragm 42 is restricted, causing a pressure drop across the restriction and, hence, a slow filling of the brake chamber as depicted by curve C in FIG. 6. As will be appreciated, the pressure of the air conveyed from the air source 18 to the brake chamber 24 will correspond to the brake pedal controlled pilot valve pressure applied to the upper side of the diaphragm 42.

If, on the other hand, the operator rapidly applies brake pedal pressure above the upper set point, which is normally the case when an abrupt slowing or stopping of the vehicle is required, and the vehicle is operating on a dry surface, the piston 142 will shift rapidly from the position shown in FIG. 5a to the position shown in FIG. 5b wherein the piston abuts shoulder 186. The extension 180 in the piston will carry the restrictor in the leftward direction so that the restrictor head 132 is on the left side of the restriction 140. In this position of the restrictor, the projected area between the restriction 140 and the conical surface 136 is equal to or greater than the area of the nominal flow passage area so that the flow restrictor head causes no flow restriction through the bore. It is noted that during the aforementioned shifting of the restrictor, the head 132 will pass rapidly through the restriction opening 141 so that there is only a momentary small pressure drop above the diaphragm 42. This pressure drop will not effect the pressure in the brake chamber because the chamber 52 above the diaphragm is much smaller than the total brake volume in the system. Hence, high air pressure will be applied to the brake drums.

When a skid occurs on the dry surface while high brake pressure is being applied, the wheel speed sensor device 28 senses the wheel-locked condition. The sensor produces a signal which energizes the solenoid 108 causing the plunger 102 to shift in the leftward direction to open the passage 100 thus dumping air to the vent valve from above the diaphragm 42, which in turn separates the valve seat 68 from the upper edge 66 of the poppet dumping the air from the brake chamber 24. Under these conditions the air pressure in the bore 114 is reduced so that the piston 142 will shift in the rightward direction under the force of the spring 176 as seen in FIG. 5c. The force of the air venting through the bore 114 from above the diaphragm 42 will retain the flow restrictor 120 in essentially the same position as in FIG. 5b wherein the head 132 of the flow restrictor is on the left side of the restriction 140. At the end of the skid condition, when the wheel 126 commences rotating again, a signal transmitted from the speed sensor 28 to the solenoid 108 de-energizes the same, thus closing the outlet passage 100 and opening the inlet passage 96 of the pilot valve. It will be appreciated that the operator still has his foot positioned on the brake pedal during this sequence of events applying brake pressure above the upper set point. Thus, air pressure will again be introduced through the pilot valve into the bore 114 and the foregoing sequence will be repeated, as depicted by curve A in FIG. 6, until no further skidding in encountered.

When operating on a slippery road, the speed sensor and computer device 28 regulates the solenoid to maintain pilot pressure within the upper and lower set points indicated by lines D and E in FIG. 6, regardless of the fact that the operator is applying full brake pressure. In other words, the computer overrides the operator. Thus, if a skid occurs within the preset range, the device 28 will produce a signal to energize the solenoid to rapidly dump air from the brake chamber causing the piston and restrictor to assume the position shown in FIG. 5c wherein the restrictor head 132 is positioned on the left side of the restriction 140. When the sensor device 28 senses the end of the skid, i.e., when the wheels commence rotating again, it will produce a signal to de-energize the solenoid permitting brake pedal pressure to be re-applied to the diaphragm 42. This pressure will act upon the head 132 and the discs 124 and 126 of the flow restrictor to shift the same in the rightward direction as seen in FIG. 5d. Also, as the air pressure in the pilot valve exceeds the lower set point, the piston 142 will assume the intermediate position illustrated in FIG. 5d. In this position, the extension pin 180 on the piston 142 is positioned midway between the sides of the slot 145. With the extension pin 180 so positioned, it will form a stop engageable by the disc 124 on the flow restrictor. When the disc 124 engages the pin, the head 132 of the flow restrictor will be centrally positioned in the restriction 140 so that there is a high flow restriction or pressure drop across the restriction. As a consequence, air pressure exiting from the passage 119 to the space above the flexible diaphragm of the diaphragm valve will increase at a rate substantially less than when the system is operating in a higher brakes chamber pressure range above the upper set limit. If a skid is encountered again within the preset limit, the foregoing brake chamber dumping and fitting sequence will repeat. Thus when the brake pressure is within the preset limits there will be a slower, or softer, re-application of brake pressure after a skid has ended as indicated by curve C in FIG. 6.

Accordingly, by the present invention, the flow restrictor 120 causes the diaphragm valve to effect an increase in brake chamber pressure, when operating at relatively low brake pedal controlled pressure range, at a rate less than when the flow restrictor operates in the high pressure range. Thus, an anit-skid brake control system incorporating the control valve of the present invention will perform to minimize skids more effectively when highly slippery road conditions are encountered, than prior anti-skid brake control systems.

Figure 7:
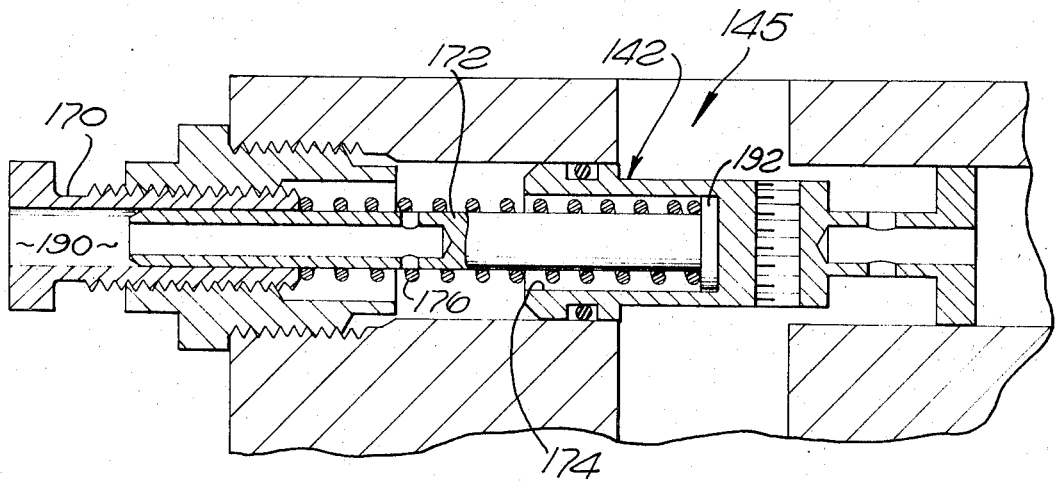
FIG. 7 is a fragmentary partial vertical sectional view illustrating a modified form of a flow restrictor positioning device which may be utilized in the present invention.

Reference is now made to FIG. 7 in which there is illustrated a modified form of the flow restrictor positioning means 142. In this arrangement the spring guide 172 is slidably received in an axially extending passage 190 formed in the set screw 170. The guide 172 is formed with an enlarged head 192 which is retained in the bottom of the recess 174 in the piston 142. The spring 176 extends from the head 192 to the end of set screw 170. It will be appreciated that threading of this set screw will allow the adjustment of the force of the spring 176.

What is claimed is:

1. A pressure regulating valve assembly comprising:

a valve body embodying primary valve means and pilot valve means;

said primary valve means including fluid pressure inlet and outlet ports, a vent valve and a valve element movable between first, second and third positions, in said first position said valve element blocking flow of fluid between said inlet port, said outlet port and said vent valve, in said second position said valve element providing flow communication between said inlet and outlet ports, and in said third position said valve element providing flow communication between said outlet port and said vent valve;

means resiliently biasing said valve element to said first position;

said pilot valve means being operable to shift said valve element to said second and third positions;

flow restrictor means including a slidable piston-like element interposed between said pilot valve means and said primary valve means and being movable between relatively high and low flow restriction positions; and positioning means engageable with said piston-like element for positioning said element in said relatively high flow restriction position upon introduction of a predetermined fluid pressure into said pilot valve means.

2. A valve assembly as set forth in claim 1 wherein:

said pilot valve means includes inlet and outlet passages, and a plunger movable between said passages to close one passage while leaving the other open, said outlet passage being in flow communication with the atmosphere;

an intermediate passage is provided in said valve body in flow communication with said inlet passage when said outlet passage is closed by said plunger; and said intermediate passage communicating with said valve element whereby fluid introduced into said inlet passage and passing into said intermediate passage urges said valve element toward said second position thereof.

3. A valve assembly as set forth in claim 2 wherein: said flow restrictor means is positioned in said intermediate passage.

4. A valve assembly as set forth in claim 3 wherein said positioning means comprises:

a piston slidable in a bore formed in said valve body, said bore communicating with said intermediate passage whereby fluid pressure in said intermediate passage urges said piston in one direction;

spring means biasing said piston in a direction opposite to said one direction; and a radially extending pin on said piston having a lost-motion connection with said piston-like element.

5. A valve assembly as set forth in claim 4 wherein said flow restrictor means comprises:

a bore portion in said intermediate passage, said bore portion extending parallel to said bore;

said piston-like element being slidable in said bore portion;

a restiction in said bore portion:

said piston-like element defining spaced forwardly and rearwardly facing surfaces disposed on opposite sides of said pin providing said lost-motion connection therewith;

means defining a passage extending axially through said piston-like element; and a head on said piston-like element having a cross-section less than that of said restriction, said head being on the end of said piston-like element closest to said pilot valve.

6. A valve assembly as set forth in claim 5 wherein: in said high flow restriction position of said piston-like element said head is positioned in said restriction.

7. A valve assembly as set forth in claim 5 wherein: said spring means exerts a biasing force on said piston which is a function of said predetermined fluid pressure.

8. A valve assembly as set forth in claim 7 wherein: said spring means exerts said biasing force in the same direction as fluid pressure entering said pilot valve inlet passage acts upon said piston-like element.

9. A valve assembly as set forth in claim 5 wherein: said piston-like element includes axially spaced cylindrical discs joined by a central stem, said passage defining means comprising holes in said discs.

10. A valve assembly as set forth in claim 4 wherein said flow restrictor means comprises:
a bore portion in said intermediate passage, said bore portion extending parallel to said bore;
said piston-like element being slidable in said bore portion;
a restriction in said bore portion;
means defining a passage extending axially through said piston-like element; and
a head on said piston-like element having a cross-section less than that of said restriction, said head being on the end of said piston-like element closest to said pilot valve.

11. A valve assembly as set forth in claim 3 wherein said flow restrictor means comprises:
a bore portion in said intermediate passage;
said piston-like element being slidable in said bore portion;
a restriction in said bore portion;
means defining a passage extending axially through said piston-like element; and
a head on said piston-like element having a cross-section less than that of said restriction, said head being on the end of said piston-like element closest to said pilot valve.

12. A valve assembly as set forth in claim 11 wherein said positioning means comprises:
a piston slidable in a bore formed in said valve body extending parallel to said bore-portion, said bore communicating with said bore portion whereby fluid pressure in said intermediate passage urges said piston in one direction;
spring means biasing said piston in a direction opposite to said one direction with a force which is a function of said predetermined fluid pressure; and
means providing a lost-motion connection between said piston and said piston-like element.

13. A valve assembly as set forth in claim 1 wherein: said valve body defines a chamber;
said primary valve is a diaphragm valve including a flexible diaphragm having its edge fixed relative to and sealed to said valve body dividing said chamber into upper and lower sections, said inlet and outlet ports opening into said lower section;

said pilot valve means communicating with said upper section;
said movable valve element includes a sleeve sealed to said diaphragm and a hollow poppet in said lower section coaxial with said sleeve;
a downwardly facing valve seat is formed on said body in said lower section between said inlet and outlet ports;
said resilient biasing means normally urges said poppet upwardly into sealing engagement with said valve seat;
the upper end of said poppet is in releasably sealing contact with a downwardly facing valve seat on said sleeve; and
said vent valve communicates with the interior of said sleeve and poppet whereby axial separation of said sleeve and poppet places said outlet port in flow communication with said vent valve.

14. A valve assembly as set forth in claim 13 wherein: said pilot valve means includes inlet and outlet passages, and a plunger movable between said passages to close one passage while leaving the other open, said outlet passage being in flow communication with said vent valve; and
an intermediate passage is provided in said valve body in flow communication with said inlet passage when said outlet passage is closed by said plunger, said intermediate passage communicating with said upper chamber section whereby fluid introduced into said inlet passage and passing into said intermediate passage urges said diaphragm and, hence, said sleeve and poppet downwardly.

15. A valve assembly as set forth in claim 14 wherein: said flow restrictor means is positioned in said intermediate passage.

16. A valve assembly as set forth in claim 15 wherein said flow restrictor means comprises:
a bore portion in said intermediate passage;
said piston-like element being slidable in said bore portion;
a restriction in said bore portion;
means defining a passage extending axially through said piston-like element; and
a head on said piston-like element having a cross-section less than that of said restriction, said head being on the end of said piston-like element closest to said pilot valve.

17. A valve assembly as set forth in claim 16 wherein said positioning means comprises:
a piston slidable in a bore formed in said valve body extending parallel to said bore-portion, said bore communicating with said bore portion whereby fluid pressure in said intermediate passage urges said piston in one direction;
spring means biasing said piston in a direction opposite to said one direction with a force approximately equal to said predetermined fluid pressure; and
means providing a lost-motion connection between said piston and said piston-like element.

18. A pressure regulating valve assembly for use in an anti-skid brake control system having a brake chamber operable at relatively high and low pressure ranges, said system having an air pressure source, a brake pedal controlled pressure supply for applying air pressure to said assembly in said relatively high and low pressure ranges, and a wheel speed sensing device operable to produce a first signal indicating a substantially wheel-locked condition and a second signal indicating a wheel-rotating condition, said valve assembly comprising:

pilot valve means and diaphragm valve means:

said pilot valve means being responsive to said sensing device signals and being adapted to be coupled to said brake pedal controlled pressure supply;

said diaphragm valve means being responsive to said pilot valve means for supplying air pressure from said source to said brake chamber proportional to the air pressure applied to said pilot valve means from said brake controlled pressure supply;

said pilot valve means controlling said diaphragm valve means to rapidly dump air pressure from said brake chamber in response to said first signal from said sensing device; and flow restrictor means interposed between said pilot valve means and said diaphragm valve means, said flow restrictor means being operable in said brake pedal controlled low pressure range, in response to said second signal from said sensing device, to cause said diaphragm valve means to effect an increase in brake chamber pressure at a rate less than when said flow restrictor means operates in said high pressure range.

19. A valve assembly as set forth in claim 18 wherein:
said diaphragm valve means includes a fluid pressure inlet port adapted to be coupled to said source, an outlet port adapted to be coupled to said brake chamber, a vent valve and a valve element movable between first, second and third positions, in said first position said valve element blocking flow of air between said inlet port, said outlet port and said vent valve, in said second position said valve element providing flow communication between said inlet and outlet ports, and in said third position said valve element providing flow communication between said outlet port and said vent valve;

means resiliently biasing said valve element to said first position; and said pilot valve means being operable to shift said valve element to said second position in response to said second signal and operable to shift said valve element to said third position in response to said first signal.

20. A valve assembly as set forth in claim 19 wherein:
said flow restrictor means is movable between relatively high and low flow restriction positions, said flow restrictor means shifting to said high flow restriction position in response to said second signal from said sensing device.

21. A valve assembly as set forth in claim 20 including:

positioning means for positioning said flow restrictor means in said high flow restriction position.

22. A valve assembly as set forth in claim 21 wherein:
said pilot valve means includes an inlet passage adapted to be coupled to said brake pedal controlled pressure supply, an outlet passage in flow communication with said vent valve, and a plunger movable between said passage while leaving the other open;

an intermediate passage is provided in flow communication with said inlet passage when said outlet passage is closed by said plunger; and said intermediate passage communication with said valve element whereby air introduced into said inlet passage and passing with said intermediate passage urges said valve element toward said second position thereof.

23. A valve assembly as set forth in claim 22 wherein:
said flow restrictor means is positioned in said intermediate passage.

24. A valve assembly as set forth in claim 23 wherein said flow restrictor means comprises:
a piston-like element slidable in a bore portion of said intermediate passage;
a restriction in said bore portion;
means defining a passage extending axially through said piston-like element; and
a head on said piston-like element having a cross-section less than that of said restriction, said head being on the end of said piston-like element closest to said pilot valve.

25. A valve assembly as set forth in claim 24 wherein said positioning means comprises:
a piston slidable in a bore extending parallel to said bore portion, said bore communicating with said bore portion whereby fluid pressure in said intermediate passage urges said piston in one direction;
spring means biasing said piston in a direction opposite to said one direction; and
means providing a lost-motion connection between said piston and said piston-like element.

26. A valve assembly as set forth in claim 18 wherein an intermediate passage is provided between said pilot valve means and said diaphragm valve means and said flow restrictor means comprises:
a piston slidable in a bore extending parallel to said bore portion, said bore communicating with said bore portion whereby fluid pressure in said intermediate passage urges said piston in one direction;
spring means biasing said piston in a direction opposite to said one direction; and
means providing a lost-motion connection between said piston and piston-like element.

* * * * *